United States Patent
Awakura et al.

(12) 
(10) Patent No.: US 8,127,319 B2
(45) Date of Patent: Feb. 28, 2012

(54) DISK REPRODUCING APPARATUS IMPLEMENTING DETECTION OF DISK INSERTION CONDITION FOR LOADING AND EJECTION OPERATIONS

(75) Inventors: Yoshifumi Awakura, Tokyo (JP); Takaharu Eguchi, Tokyo (JP); Tatsunori Fujiwara, Tokyo (JP); Daisuke Morimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 193 days.

(21) Appl. No.: 12/663,195

(22) PCT Filed: Jun. 4, 2008

(86) PCT No.: PCT/JP2008/001416
§ 371 (c)(1),
(2), (4) Date: Dec. 4, 2009

(87) PCT Pub. No.: WO2009/016790
PCT Pub. Date: Feb. 5, 2009

(65) Prior Publication Data
US 2010/0175077 A1    Jul. 8, 2010

(30) Foreign Application Priority Data

Aug. 1, 2007  (JP) ................................ 2007-201206

(51) Int. Cl.
*G11B 17/04*    (2006.01)
(52) U.S. Cl. ...................................... 720/626; 720/624
(58) Field of Classification Search .................. 720/617, 720/619, 624, 625, 626
See application file for complete search history.

(56) References Cited

U.S. PATENT DOCUMENTS

| | | | | |
|---|---|---|---|---|
| 6,480,442 B1* | 11/2002 | Nakatani et al. | ........... | 369/30.36 |
| 6,510,110 B2* | 1/2003 | Watanabe et al. | .......... | 369/30.32 |
| 7,540,002 B2* | 5/2009 | Tanabe et al. | ................. | 720/628 |
| 2002/0150020 A1* | 10/2002 | Mizoguchi et al. | .......... | 369/77.1 |
| 2004/0062155 A1 | 4/2004 | Urushihara et al. | | |
| 2005/0237905 A1* | 10/2005 | Nabe et al. | ..................... | 369/120 |
| 2005/0251815 A1* | 11/2005 | Lin | ............................... | 720/626 |
| 2006/0117331 A1* | 6/2006 | Joo et al. | ....................... | 720/626 |
| 2007/0288946 A1* | 12/2007 | Chang et al. | .................. | 720/626 |
| 2008/0235714 A1* | 9/2008 | Hasegawa et al. | ............ | 720/601 |
| 2009/0025018 A1* | 1/2009 | Sato et al. | ..................... | 720/600 |

FOREIGN PATENT DOCUMENTS

| | | |
|---|---|---|
| EP | 1 852 862 A2 | 11/2007 |
| JP | 8-297907 A | 11/1996 |
| JP | 10-116459 A | 5/1998 |
| JP | 10-162466 A | 6/1998 |

(Continued)

*Primary Examiner* — Brian Miller
(74) *Attorney, Agent, or Firm* — Birch, Stewart, Kolasch & Birch, LLP

(57) ABSTRACT

A disk reproducing apparatus includes a disk detecting lever that has a switch abutting section and a light intercepting section and rotates according to the loading operation and the ejecting operation of a disk caused by abutment of the outer edge of the disk against a detecting pin; a single switch that is switched by the switch abutting section and thereby detects the loading start position, and also the inserting position of the disk; and a single photosensor that detects the inserting position of the disk with keeping the light intercepting condition thereof by either the light intercepting section or the disk and also detects the ejection end position when the light intercepting condition brought about by the disk has been released and then the light intercepting condition brought about by the light intercepting section is released.

1 Claim, 10 Drawing Sheets

| Disk Position | | 4a | 4b | → | 4e | 4d | 4c | 4d | 4e | → | 4b |
|---|---|---|---|---|---|---|---|---|---|---|---|
| State | No Disk | Loading Start | Loading | | | | Ready to Reproduction | Ejecting | | | Ejection End |
| | Roller Stop | Roller Rotating | | | | | Roller Stop | Roller Reversing | | | Roller Stop |
| Switch C | OFF | ON | ON | ON | ON | ON | ON | ON | ON | ON | ON |
| Photosensor F | OFF | OFF | OFF | ON | ON | ON | ON | ON | ON | ON | OFF |

FOREIGN PATENT DOCUMENTS

| | | |
|---|---|---|
| JP | 2003-248995 A | 9/2003 |
| JP | 2004-22128 A | 1/2004 |
| JP | 2005-222600 A | 8/2005 |
| WO | WO-2006/075738 A1 | 7/2006 |

* cited by examiner

Disk Insertion Direction

FIG. 4

| Disk Position | 4a | 4b | → | 4e | 4d | 4c | 4d | 4e | → | 4b |
|---|---|---|---|---|---|---|---|---|---|---|
| State | Loading Start | Loading | | | | Ready to Reproduction | Ejecting | | | Ejection End |
| | Roller Stop / No Disk | Roller Rotating | | | | Roller Stop | Roller Reversing | | | Roller Stop |
| Switch C | OFF / ON | ON | ON | ON | ON | ON | ON | ON | ON | ON |
| Photosensor F | OFF / OFF | OFF | ON | ON | ON | ON | ON | ON | ON | OFF |

FIG. 6 PRIOR ART

| Disk Position | | 4a | 4b | → | 4c | → | 4b |
|---|---|---|---|---|---|---|---|
| State | No Disk | Loading Start | Loading | Loading | Ready to Reproduction | Ejecting | Ejection End |
| | Roller Stop | Roller Rotating | Roller Rotating | Roller Rotating | Roller Stop | Roller Reversing | Roller Stop |
| Switch A | OFF | ON | ON | ON | ON | ON | ON |
| Photosensor B | OFF | OFF | OFF | ON | ON | ON | OFF |

Disk Insertion Direction

FIG. 10 PRIOR ART

| Disk Position | | 4a | 4b | → | 4e | 4d | → | 4c | 4d | 4e | → | 4b |
|---|---|---|---|---|---|---|---|---|---|---|---|---|
| State | No Disk | Loading Start | Roller Rotating | | Loading | | | Ready to Reproduction | Ejecting | | | Ejection End |
| | Roller Stop | | | | | | | Roller Stop | Roller Reversing | | | Roller Stop |
| Switch C | OFF | ON | ON | ON | ON | ON | OFF | OFF | ON | ON | ON | ON |
| Photosensor D | OFF | OFF | OFF | ON | OFF | OFF | OFF | OFF | OFF | OFF | ON | OFF |

DISK REPRODUCING APPARATUS IMPLEMENTING DETECTION OF DISK INSERTION CONDITION FOR LOADING AND EJECTION OPERATIONS

TECHNICAL FIELD

The present invention relates to a disk reproducing apparatus of a slot-in scheme, and more particularly to a means for detecting a disk insertion condition.

BACKGROUND ART

In recent years, an on-vehicle disk reproducing apparatus for playing back an optical disk such as a CD or a DVD employs a slot-in system, which does not have a tray for loading and unloading the disk and in which a disk is directly inserted in a slit-like opening so as to effectively use the limited space inside the vehicle. This system automatically performs a loading operation for carrying a disk, which is inserted in a predetermined position of the opening, to a reproducing position automatically and for placing the disk on a turntable, and an ejecting operation for removing the disk on the turntable therefrom after playback and for carrying the disk to the position where the disk can be grasped and removed through the opening. In this disk reproducing apparatus, there is a state where the disk is considerably exposed from the slit opening at the loading time and also at the ejecting time, and thus there is a possibility that a user presses in the disk or pulls it out by force. Therefore, a detecting means for watching not only a loading start position and an ejection end position but also the position of the disk within the disk reproducing apparatus is required.

In on-vehicle disk reproducing apparatuses, there is a technology enabling the position of a disk to be surely detected during the period of time from loading start to ejection end, using a plurality of photosensors (see FIG. 11 shown as a conventional example in Patent Document 3, for instance). However in practice, since a photosensors is expensive, a disk position detecting means using two photosensors, as shown in FIG. 5 herein, is employed. In FIG. 5, reference numerals 4a, 4b, and 4c denote the positions of a disk 4. A chassis 1 has attached on the center thereof a turntable 3, a spindle motor (not shown) for rotating and driving the turntable, and an optical pickup 5 for reading signals. The chassis has provided on the side of opening 11, through which the disk is inserted or removed, a photosensor A, a sending roller 2, and a photosensor B in the order toward the center of the chasses. The photosensors A and B each are a transmission type or a reflection type photosensors combining an LED with a photosensor, as is commonly known.

When the disk 4 is inserted through the opening 11 and comes to the loading start position 4a, the photosensor A turns on because light thereto is intercepted by the disk 4, and then the sending roller 2 rotates responding to the detection output therefrom. When the disk 4 is further inserted to be loaded onto the sending roller 2, the disk is transferred inwardly by the roller 2. When the disk 4 reached an ejection end position 4b on a transfer process, the light to other photosensor B is also intercepted and therefore photosensor B turns on. When the disk 4 is further transferred by the roller 2 to the reproducing position 4c, the edge of the disk 4 abuts against a roller stop switch (not shown) to turn on the switch and thereby the sending roller 2 stops, though those operations are generally known. The disk 4 is released from the sending roller 2 at the reproducing position 4c to be placed on the turntable 3, and then goes into a reproducible state. Then, when an ejecting switch (not shown) is pressed by a user, the disk 4 goes into the ejecting state where the disk is removed from the turntable 3 and is carried toward the opening 11 by the sending roller 2 rotating in a direction opposite to that in the loading. When the disk 4 comes to the ejection end position 4b to be moved off from the photosensor B, the photosensor B is switched from the "on" to the "off", and the sending roller 2 stops responding to the detection output. Under such a condition, the center hole of the disk 4 is exposed from the opening 11 so that pulling out the disk therefrom with the fingers becomes possible. When the disk 4 is taken out therefrom to be moved off from the position 4a, the photosensor A also turns off. In a series of operations described above, as to the detection operation of the photosensors A and B with respect to the disk 4, the sensor A is in the on-state during the period of time from the loading start to the ejection end and the photosensor B remains in the on-state from loading to ejecting, as shown in FIG. 6, thus accurately indicating the position of the disk 4 within the apparatus.

However, when the system for detecting the disk is built with photosensors as described above, since a photo sensor is expensive and wiring lines for supplying power and detecting signals, a control board, and electronic parts are required; their cost tends to be relatively high. For this reason, as an inexpensive detecting mechanism, the following technology is disclosed: a detecting lever rotating upon abutment of a disk is provided, a microswitch (hereinafter, referred to simply as a "switch") is operated by the microswitch, to thus detect the position of a disk (see Patent Document 1, Patent Document 2, and Patent Document 3, for instance).

Examples of the structure of the disk position detecting means employing two switches and switching with a disk detecting lever are shown in FIG. 7 to FIG. 9 and will be discussed. A disk detecting lever 6 is attached so as to rotate about a shaft 6d provided on, e.g., the left side on the opening side of a chassis, and is always urged counterclockwise by a spring (not shown) in a state that a disk 4 has not been inserted, such that a detecting pin 6a for detecting the outer edge of the disk is located on the opening side thereof. Further, the disk detecting lever 6 has a switch abutting section 6b on the circumference thereof. The disk reproducing apparatus has disposed at a predetermined position on the chassis thereof, a switch C for defining the loading start position and a switch D for defining the ejection end position, so that the respective actuators of the switches oppose the circumference of the disk detecting lever 6. In this structure, the amount of the rotation of the disk detecting lever 6 is the same at the disk positions 4a and 4d in FIG. 8 and is the same at the disk positions 4b and 4e in FIG. 9.

In FIG. 8, when the disk 4 is inserted and comes to the loading start position 4a, the outer edge of the disk 4 abuts against the detecting pin 6a attached to the disk detecting lever 6 and then a force pushing the detecting pin 6a toward the outer peripheral direction of the chassis is applied. Therefore, the disk detecting lever 6 rotates clockwise, and the switch abutting section 6b provided on the circumference of the lever abuts against the switch C and switches the switch C from "off" to "on." Upon such a switching process, the switch C detects the insertion of the disk 4 and the sending roller 2 rotates responding to the detection output from the switch. When the disk 4 is further inserted to be loaded onto the sending roller 2, the disk is automatically transferred toward the center of the disk reproducing apparatus by the sending roller 2. As the disk 4 proceeds, the disk detecting lever 6 also rotates clockwise, and when the disk 4 comes to the position 4b as shown in FIG. 9, the switch abutting section 6b abuts against the switch D. When the disk 4 exceeds over the position 4b, the switch D is switched from "off" to "on" by the switch abutting section 6b. When the disk 4 further proceeds, since the detecting pin 6a exceeds the maximum excursion and then returns, the switch abutting section 6b moves off from the switch D at the position 4e shown in FIG. 9 and thereby the switch D turns off. Moreover, as the disk 4 approaches the position 4d, the detecting pin 6a further returns, and when the disk 4 exceeds the position 4d, the switch C turns from "on" to "off" as shown in FIG. 8. Accordingly, the disk 4 reaches the reproducing position 4c when both switches C and D are "off". At this time, the edge of the disk 4 abuts against a roller stop switch (not shown) to turn on the switch and thereby the sending roller 2 stops. The disk 4 is released from the sending roller 2 at the reproducing position 4c to be placed on the turntable 3, and goes into a reproducible state. Then, when an ejecting switch is pressed by a user, the disk 4 is removed from the turntable 3 and goes into the ejecting operation where the disk is carried toward the opening 11 by the sending roller 2 rotating in a direction opposite to that in the loading. At this time, the disk 4 travels via the positions 4c, 4d, 4e, and 4b opposite those in the loading, and thus the switches C and D go through the switching states as shown in FIG. 10 along the movements of the disk detecting lever 6.

Patent Document 1: JP-A 10-116459 (1998-116459)
Patent Document 2: JP-A 2005-222600
Patent Document 3: JP-A 10-162466 (1998-162466)

When the loading start position and the ejection end position are arranged to be detected by two switches and the disk detecting lever in place of photosensors as discussed above, there are the following problems.

As shown in FIG. 9, the amount of rotation of the disk detecting lever 6 is the same at the disk positions 4e and 4b in the ejecting stage, and thus the switches C and D indicates the same state of detection. In other words, there is the moment in time at which the position (detection state) of the disk on the way of the ejection becomes the same as the position (detection state) of the disk at the ejection end position. For this reason, when the disk is mistakenly pressed in, for example, even though while the disk is being ejected and not yet goes into a state of ejection end, it can be considered that the ejection has been completed. In this case, even if a user operates it again at this time, the disk stays within the apparatus and is not ejected therefrom. Further, when the power is turned off on the way of the ejection process and then the power is turned on again, the same state also occurs, where the apparatus cannot detect the disk position.

In order to solve the problem, the switches C and D should be always held in the on-state during the period of time from the loading start to the ejection end. The switch C for detecting the disk insertion can be always kept in the on-state during the period of time from the loading start to the ejection end as described also in Patent Document 2 and Patent Document 3; however, always holding the switch D in the on-state during the period of time from the loading start to the ejection end cannot be actually carried out since the mechanism is very complicated.

The present invention has been made to solve the above-mentioned problems, and an object of the present invention is to provide a disk reproducing apparatus enabling the insertion condition of a disk to be surely detected by a compact and low-cost structure using a single photosensor, a single switch and a disk detecting lever.

DISCLOSURE OF THE INVENTION

The disk reproducing apparatus according to the present invention includes: a disk detecting lever that has a switch abutting section and a light intercepting section, and rotates according to the loading operation and the ejecting operation of the disk caused upon abutment of the outer edge of the disk against a detecting pin; a single switch that is switched by the switch abutting section and thereby detects the loading start position, and further detects the insertion condition of the disk; and a single photosensor that detects the insertion condition of the disk with keeping the light intercepting condition by either the light intercepting section or the disk, and also detects the ejection end position when the light intercepting condition brought about by the disk has been released and then the light intercepting condition brought about by the light intercepting section is released.

According to the present invention, by a compact structure using a single photosensor, a single switch, and a disk detecting lever, not only the loading start position and the ejection end position can be detected, but also the insertion state of the disk can be accurately detected during the whole period of time from the loading start to the ejection end. Therefore, even when the amount of the rotation of the disk detecting lever on the way of the ejection is the same as that of the rotation thereof at the ejection end, there is no accident such that the ejecting operation is stopped mistakenly. Further, even if the power returns from the interruption on the way of the ejection, the disk position can be determined. Moreover, it is possible to provide a disk position detecting means with reduced cost compared with the case where two photosensors are used.

BRIEF DESCRIPTION OF THE DRAWINGS

FIG. 4 is an explanatory table showing the transition of the detecting condition detected by the disk position detecting means in accordance with the first embodiment of the present invention.

FIG. 6 is an explanatory diagram showing the transition of the detecting condition detected by the disk position detecting means shown in FIG. 5.

FIG. 10 is an explanatory diagram showing the transition of the detecting condition assumed by the disk position detecting means shown in FIG. 7.

BEST MODE FOR CARRYING OUT THE INVENTION

Embodiments of the present invention will now be described with reference to the accompanying drawings in order to explain the present invention in more detail.

First Embodiment

Figure 1:
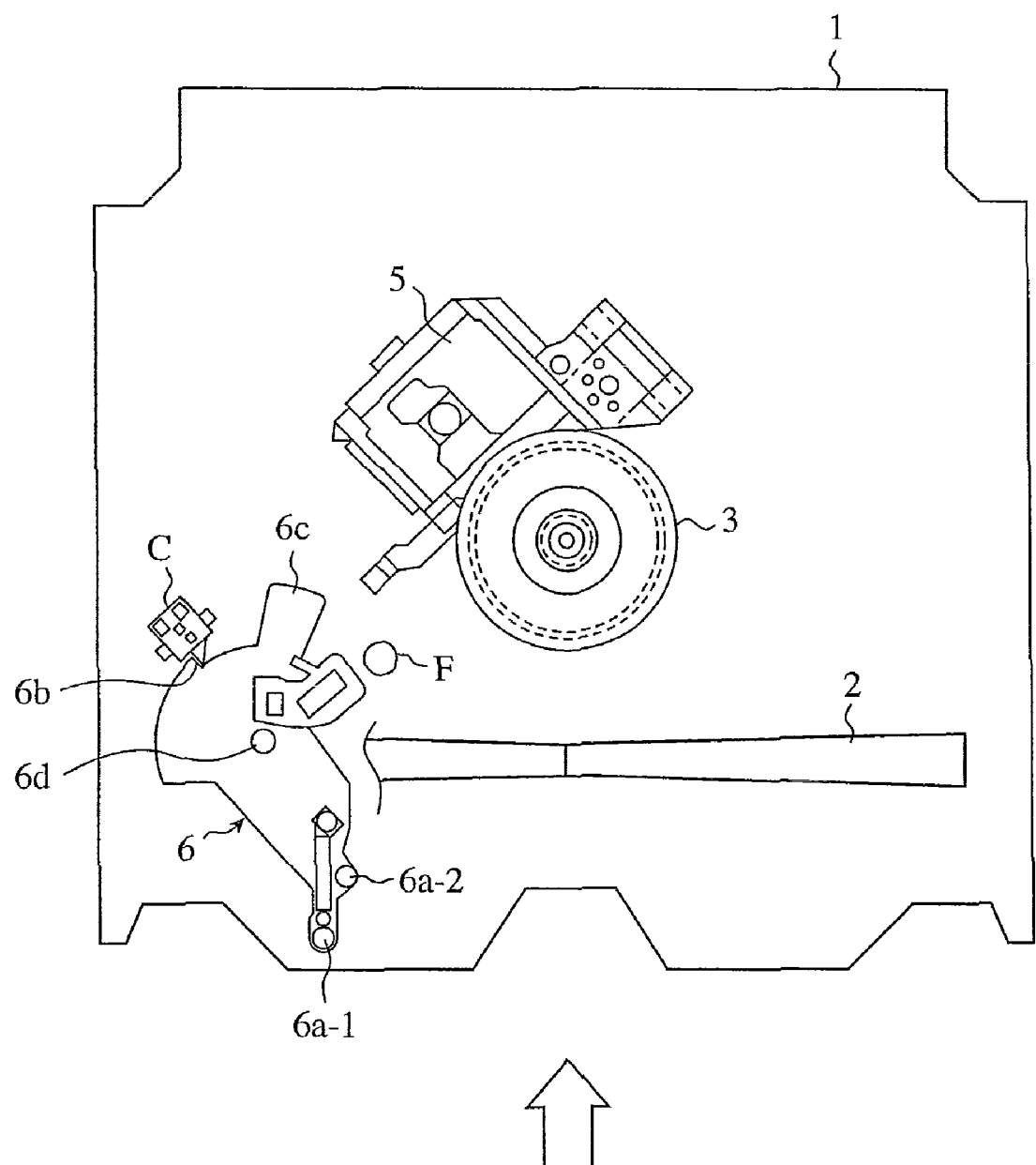
FIG. 1 is a plan view showing the arrangement of a disk position detecting means of a disk reproducing apparatus in accordance with the first embodiment of the present invention.
Figure 7:
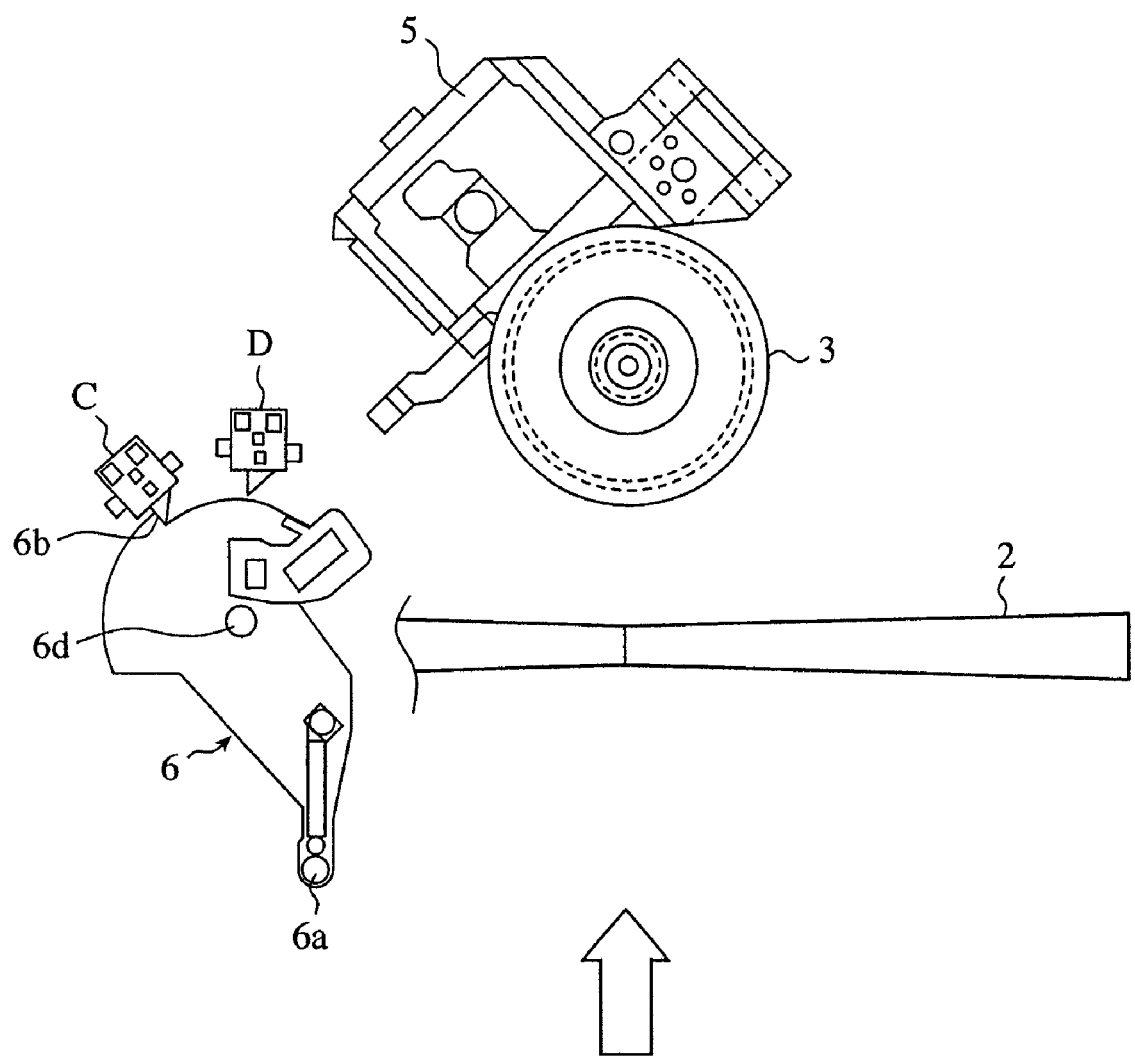
FIG. 7 is a plan view showing the arrangement of a conventional disk position detecting means using switches.
Figure 8:
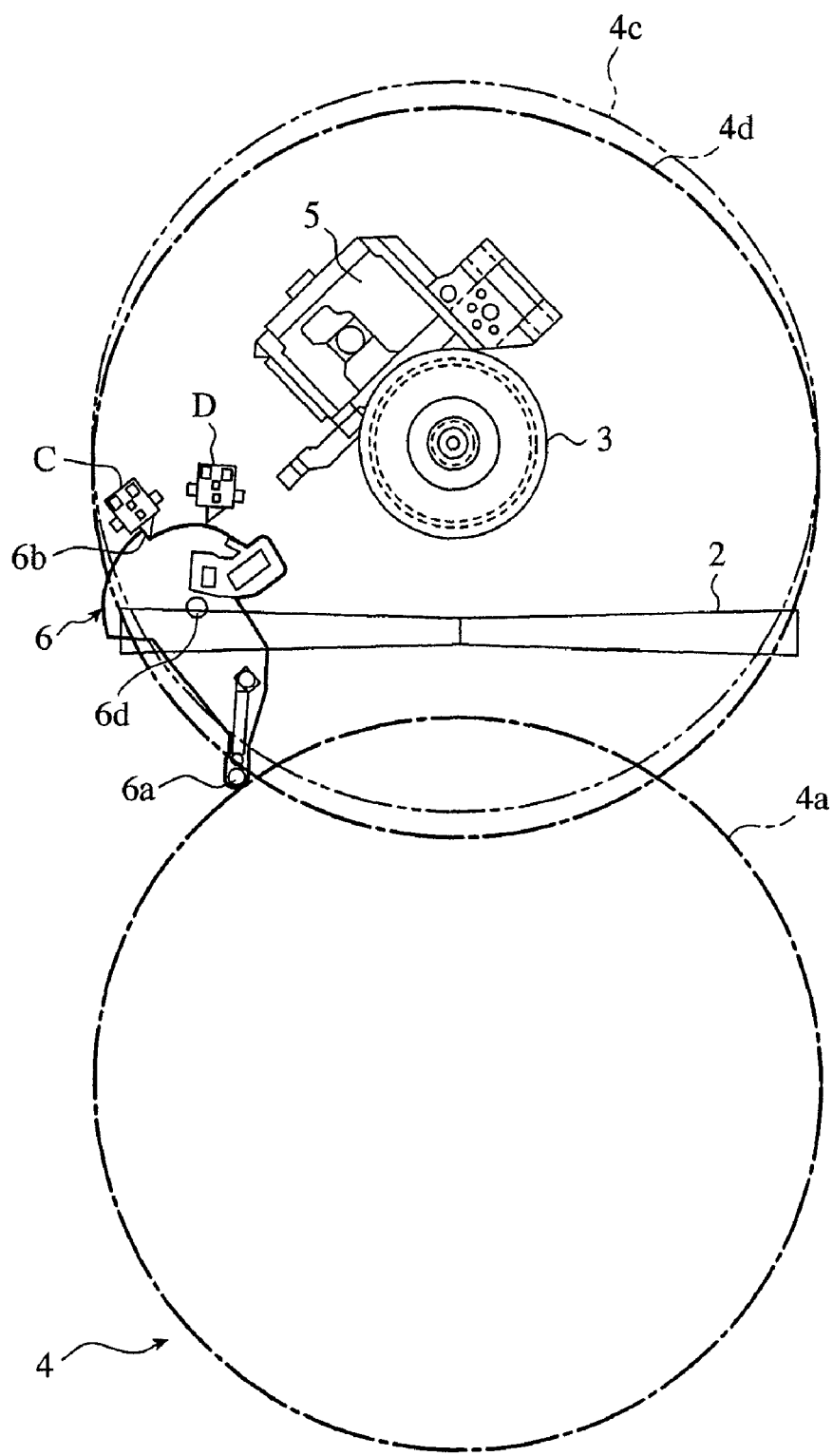
FIG. 8 is an explanatory diagram showing a detecting condition detected by the disk position detecting means shown in FIG. 7.
Figure 9:
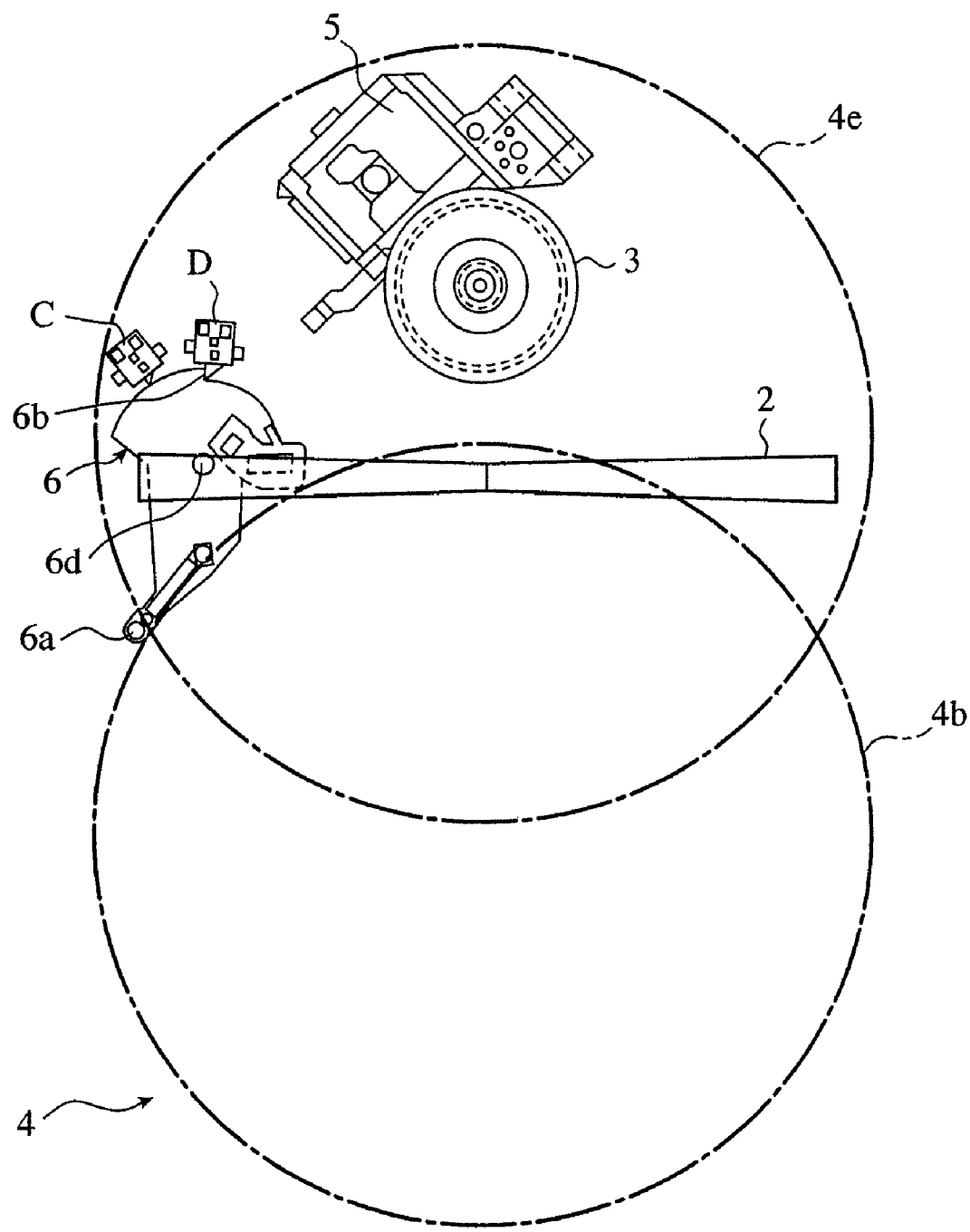
FIG. 9 is an explanatory diagram showing another detecting condition detected by the disk position detecting means shown in FIG. 7.

FIG. 1 is a plan view showing the arrangement of a disk position detecting means of a disk reproducing apparatus in accordance with the first embodiment of the present invention. In the figure, the same reference numerals are provided for the same constituent parts as those in FIG. 7.

A disk detecting lever 6 is attached so as to rotate about a shaft 6d provided on the left side, e.g., on the opening side of a chassis, and is always urged counterclockwise by a spring (not shown) when a disk has not been inserted, with a first detecting pin 6a-1 for detecting the outer edge of the disk being located on the opening side and a second detecting pin 6a-2 being located on the entry side of the disk. Further, the disk detecting lever 6 has a switch abutting section 6b and a light intercepting section 6C on the circumference thereof. The disk reproducing apparatus has disposed on the chassis thereof, a switch C for detecting the loading start position, so that the actuator of the switch opposed to the circumference of the disk detecting lever 6. Further, the chassis has disposed thereon a photosensor F for detecting the ejection end position, with the photosensor opposed to the circumference of the disk detecting lever 6, so that the photosensor turns on or off by the light intercepting section 6C of the disk detecting lever 6. Hereupon, the amount of the rotation of the disk detecting lever 6 is the same at disk positions 4a and 4d in FIG. 2 and is the same at disk positions 4b and 4e in FIG. 3.

Figure 2:
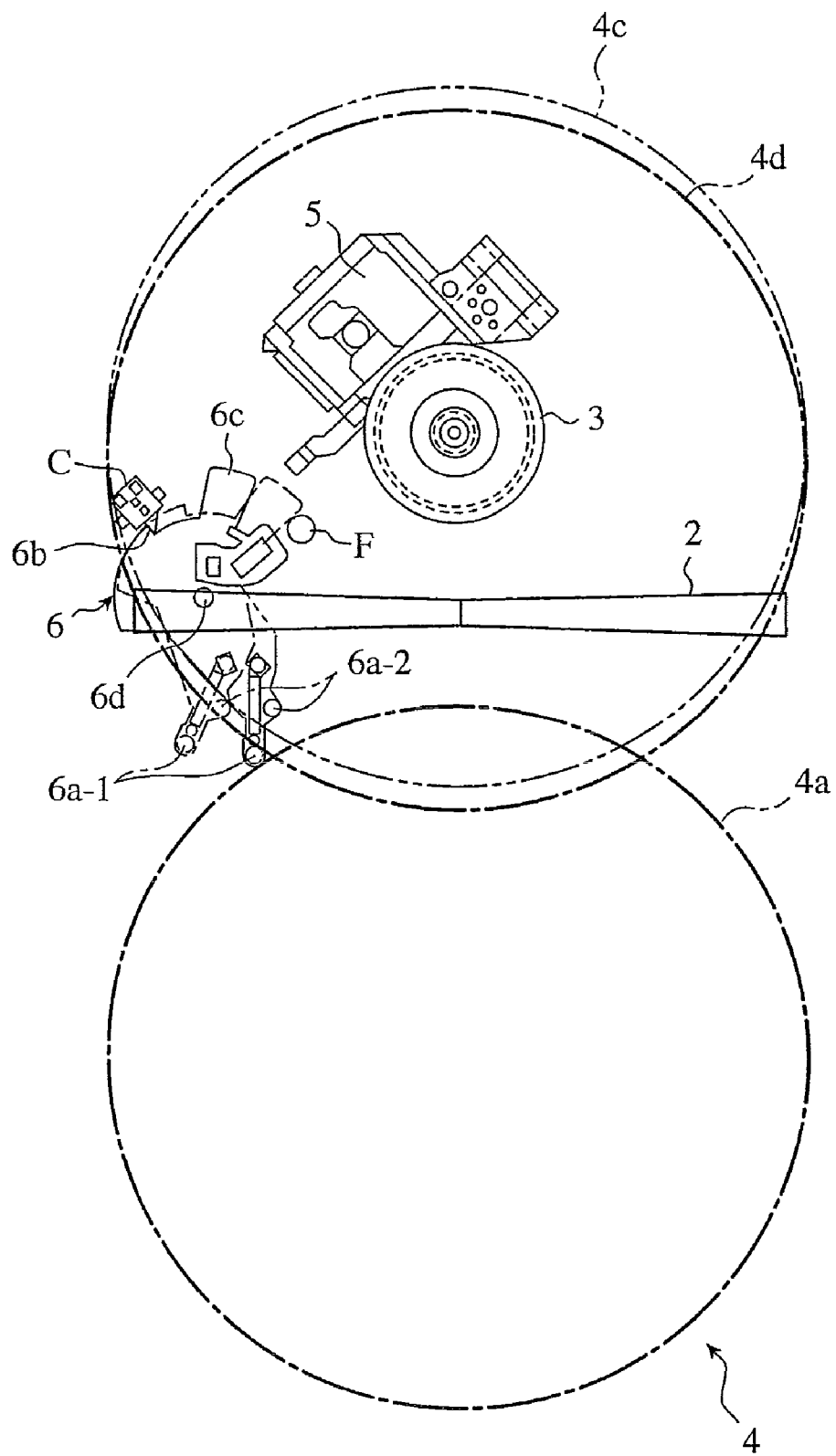
FIG. 2 is an explanatory diagram showing a position detecting condition detected by the disk position detecting means in accordance with the first embodiment of the present invention.
Figure 3:
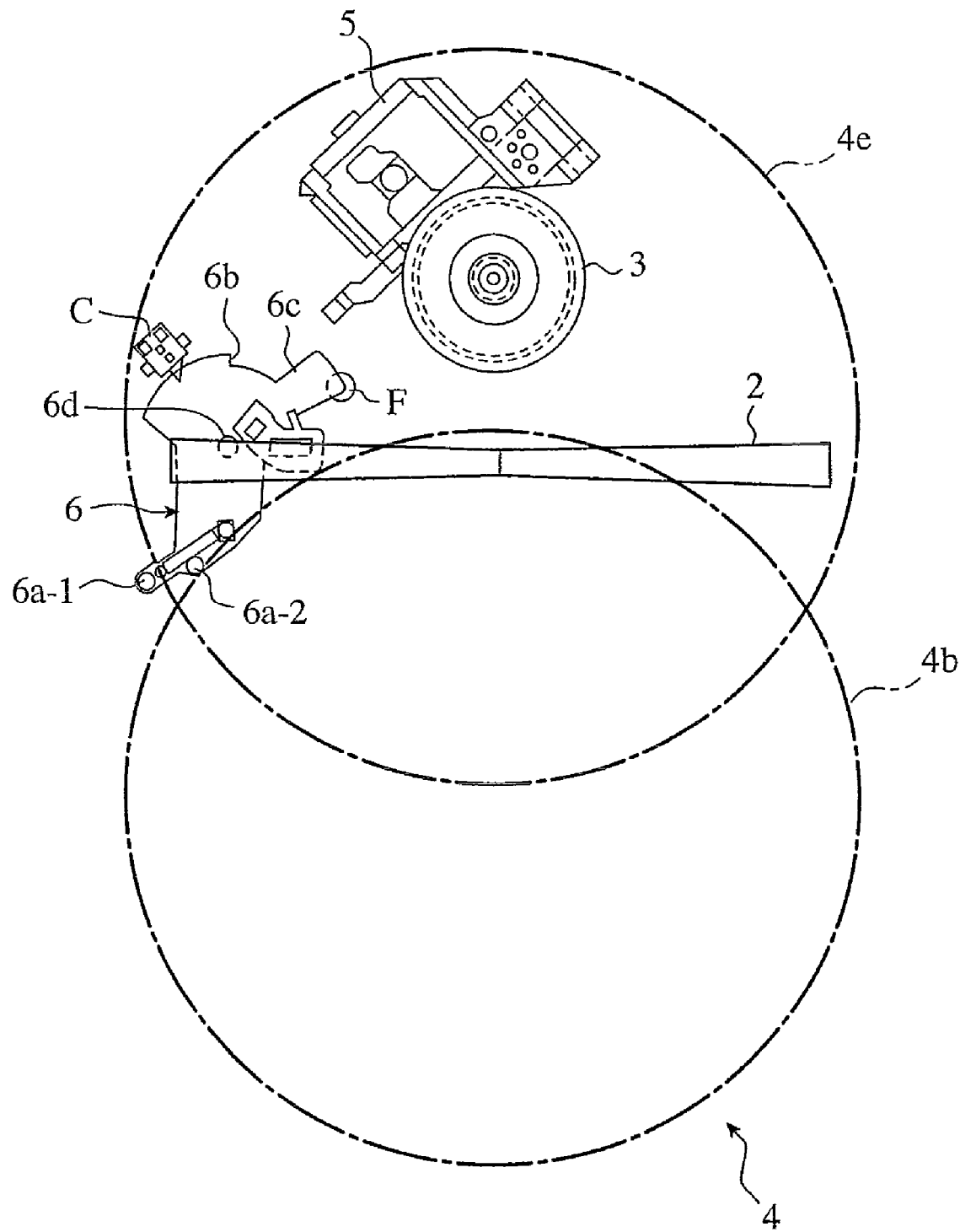
FIG. 3 is an explanatory diagram showing another position detecting condition detected by the disk position detecting means in accordance with the first embodiment of the present invention.
Figure 5:
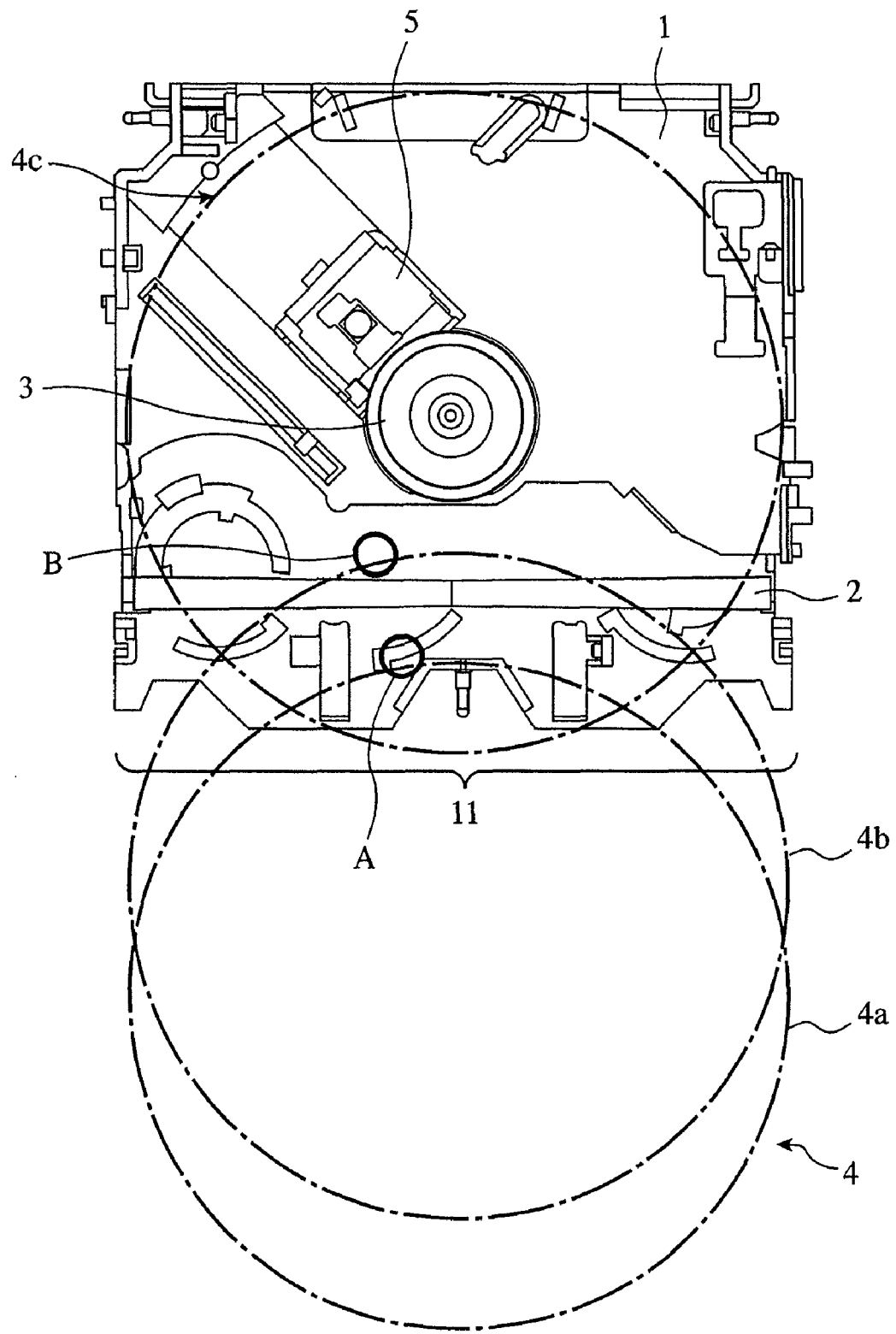
FIG. 5 is a plan view showing the internal structure of a disk apparatus to which a conventional disk position detecting means using photosensors is applied.

Next, an operation thereof will be described below:

Referring to FIG. 2, when the disk 4 is inserted and comes to the loading start position 4a, the outer edge of the disk 4 abuts against the first detecting pin 6a-1 attached to the disk detecting lever 6, and thereby the force pushing first detecting pin 6a-1 toward the outer periphery direction of the chassis is applied. Therefore, the disk detecting lever 6 rotates clockwise and the switch abutting section 6b provided on the circumference of the lever is moved and abuts against the actuator of the switch C, thus switching the switch C from "off" to "on." Upon such a switching process, the switch C detects the insertion of the disk 4 and the sending roller 2 rotates responding to the detection output therefrom. When the disk 4 is further inserted to be loaded onto the sending roller 2, the disk is automatically transferred toward the center of the disk reproducing apparatus by the sending roller 2. As the disk 4 proceeds and abuts against the second detecting pin 6a-2, the disk detecting lever 6 further rotates clockwise, and when the disk 4 passed the position 4b shown in FIG. 3, the light intercepting section 6c of the disk detecting lever 6 intercepts the incident light to the photosensor F, and thereby the detection output of the photosensor F is switched from "off" to "on." When the disk 4 further proceeds, since the disk detecting lever 6 exceeds the maximum excursion and returns, the light intercepting section 6c is moved off from the photosensor F at the position 4e shown in FIG. 3. However at that time, since the disk 4 has already come over the photosensor F, the disk 4 holds the light intercepting condition, and thereby the detection output of the photosensor F remains in the on-state. Afterward, as the disk 4 approaches the position 4d shown in FIG. 2, the disk detecting lever 6 further returns; however, since the second detecting pin 6a-2 abuts against the outer edge of the disk 4 and thereby the disk detecting lever is returned only to the chain-line position shown in FIG. 2, the switch C holds the on-state even after the disk 4 passed the position 4d. Therefore, the disk 4 reaches the reproducing position 4c in the state where both the photosensor F and the switch C stay in the on-state. When the disk comes to the reproducing position 4c, the edge of the disk 4 abuts against a disk insertion end detecting lever (not shown), and thereby a roller stop switch (not shown) turns on to stop the sending roller 2. The disk 4 is released from the sending roller 2 at the reproducing position 4c to be placed on the turntable 3, and goes into a reproducible state.

Then, in the reproducible state, when an ejecting switch (not shown) is pressed by a user, the disk 4 is removed from the turntable 3 and goes into the ejecting operation where the disk is carried toward the opening 11 by the sending roller 2 rotating in a direction opposite that of rotation in the loading stage. At this time, the disk 4 travels via the positions 4c, 4d, 4e, and 4b in the order opposite that in the loading operation. The disk 4 has already released the light intercepting condition to the photosensor F before it reaches the position 4b. At the position 4b, the light intercepting section 6c of the disk detecting lever 6 releases the light intercepting condition to the photosensor F, and thereby the photosensor F turns "off" from "on." In such a way, the ejection end is detected, and the sending roller 2 stops.

The transition of the detecting condition detected by the photosensor F and the switch C in a series of operations is as shown in FIG. 4. In FIG. 4, since the switch C and the photosensor F are always in the on-state during the period of time from the loading start to the ejection end, the inserting condition of the disk 4 within the disk reproducing apparatus is accurately detected.

As discussed above, in accordance with the first embodiment, the disk position-detecting means is arranged to include: the disk detecting lever 6 that has the switch abutting section 6b and the light intercepting section 6c, and rotates according to the loading operation and the ejecting operation of the disk caused by abutment of the first detecting pin 6a-1 and the second detecting pin 6a-2 against the outer edge of the disk; the single switch C that is switched by the switch abutting section 6b and thereby detects the loading start position, and further detects the inserting condition of the disk; and the single photosensor F that detects the inserting condition of the disk when the light intercepting condition is held by either the light intercepting section 6c or the disk and also detects the ejection end position when the light intercepting condition brought about by the disk has been released and then the light intercepting condition brought about by the light intercepting section 6c is released. Therefore, by using a compact structure, not only the loading start position and the ejection end position can be detected, but also during the period of time from the loading start to the ejection end, the inserting condition of the disk can be accurately detected. For this reason, even when on the way of the ejection, the amount of the rotation of the disk detecting lever is the same as that of the rotation thereof at the ejection end position, the ejecting operation cannot be mistakenly stopped. Further, even if the power comes back from interruption on the way of the ejection, the disk position can be determined. Moreover, a disk position detecting means of which the cost is reduced as compared with the case where two photosensors are used can be provided.

INDUSTRIAL APPLICABILITY

As described above, the disk reproducing apparatus according to the present invention is arranged to include: the single switch that is switched by the switch abutting section and thereby detect the loading start position and the inserting condition of the disk; and the single photosensor for detecting the ejection end position when the light intercepting condition brought about by the disk has been released and then the light intercepting condition brought about by the light intercepting section is released. Thus, the disk reproducing apparatus becomes low in cost and able to accurately detect the inserting condition of a disk, and therefore, the disk reproducing apparatus is suitable for use, e.g., in an on-vehicle disk reproducing apparatus of a slot-in system.

The invention claimed is:

1. A disk reproducing apparatus performing:
   a loading operation that detects the loading start position of a disk inserted through a slit opening to rotate a roller and carries the disk to a reproducing position by the roller to place the disk on a turntable; and
   an ejecting operation that removes the disk on the turntable therefrom, carries the disk by the roller which is reversely rotated, and detects an ejection end position at which the disk can be grasped and removed through the opening to stop the roller,
   wherein the disk reproducing apparatus includes:
   a disk detecting lever that has a switch abutting section and a light intercepting section, and rotates according to the loading operation and the ejecting operation of the disk caused by abutment of the outer edge of the disk against a detecting pin;
   a single switch that is switched by the switch abutting section and thereby detects the loading start position, and also detects the insertion condition of the disk; and
   a single photosensor that detects the insertion condition of the disk while maintaining the light intercepting condition thereof by either the light intercepting section or the disk and also detects the ejection end position when the light intercepting condition brought about by the disk has been released and then the light intercepting condition brought about by the light intercepting section is released.

* * * * *